Nov. 13, 1962    J. M. MULLIN    3,063,487
CHANGE PURSE CONSTRUCTION
Filed Aug. 17, 1961

INVENTOR.
John M. Mullin
BY
Frease, Bishop, Johns & Schick
ATTORNEYS

United States Patent Office 3,063,487
Patented Nov. 13, 1962

3,063,487
CHANGE PURSE CONSTRUCTION
John M. Mullin, 1474 Maple St., Barberton, Ohio
Filed Aug. 17, 1961, Ser. No. 132,081
3 Claims. (Cl. 150—37)

My invention relates to improvements in change purse construction, and more specifically to an improved change purse which may be formed of molded resilient plastic material or the like. Even more specifically, my invention relates to a change purse construction of the type which may be formed totally of resilient plastic material, and does not require any extra fastening means for allowing the insertion and retention of change therein or for the removal of change therefrom.

Certain prior constructions of change purses have been provided which are formed totally of a resilient plastic material, such as certain forms of rubber, and more usually of one of the modern relatively inexpensive plastics. All such change purse constructions are required to have means for gaining access to the inner confines thereof in order that the change may be placed therein or removed therefrom.

One of the principal difficulties with the prior change purse constructions is that, unless some complicated fastening means is provided for the plastic material around or at the access opening thereof, such as metal springs and the like, it is impossible to satisfactorily retain change therein. Thus, in use of these prior change purse constructions and particularly after they have been used for a period of time and lost certain of their closing resiliency, change is easily displaced therefrom.

It is, therefore, a general object of the present invention to provide a change purse construction which may be formed simply and totally of a molded resilient plastic material but has a unique closure means formed thereon at the access opening thereof for securely retaining this access opening closed even after a long period of use.

It is a primary object of the present invention to provide a change purse construction which may be formed totally of molded resilient plastic material and does not require the various metal reinforcements around the access opening thereof as has been required in the prior constructions in order to satisfactorily retain this access opening closed.

It is a further object of the present invention to provide a change purse construction which may be formed totally of a molded resilient plastic material and which is provided with a unique reinforced construction at the access opening thereof, which tends to force coins and the like contained within the purse toward the stronger and more secure portions of the closure means, thereby virtually eliminating the dangers of a build-up of coins and the like at the weaker portions of the closure means which could force the closure means to release.

It is still a further object of the present invention to provide a change purse construction which may be formed totally of a molded resilient plastic material and has a unique closure means thereon which is easily manipulated for gaining access to the inner confines thereof, yet is reinforced at the usual weaker portions thereof, so that this closure means cannot be forced open accidentally by change within the confines of the change purse.

Finally it is an object of the present invention to provide a change purse construction satisfying all of the foregoing objects in a satisfactory and efficient manner, and yet which may be provided at a minimum of manufacturing and material costs.

These and other objects are accomplished by the parts, constructions, arrangements, combinations and subcombinations comprising the present invention, the nature of which is set forth in the following general statement, a preferred embodiment of which—illustrative of the best mode in which applicant has contemplated applying the principles—is set forth in the following description and illustrated in the accompanying drawings, and which is particularly and distinctly pointed out and set forth in the appended claims forming a part hereof.

In general terms, the molded resilient plastic material change purse construction comprising the present invention may be stated as including side faces which are spaced generally parallel and extend vertically and longitudinally with these side faces being integrally joined by generally vertically and laterally extending end walls and a generally horizontally and laterally extending bottom wall, to thereby form an upwardly opening enclosure or pocket. The side faces and end walls terminate upwardly in a generally horizontally extending top portion within which is formed a generally longitudinally extending closure means preferably extending substantially the total longitudinal distance between the end walls for closing the side faces substantially totally longitudinally between these end walls.

The closure means may be formed with permanently open generally circular openings at either end thereof and at the upper termination of the end walls, with these circular openings being joined by a generally longitudinally extending line opening which may be formed as an interengaging arcuate saw-tooth line opening. Furthermore, the side faces may be formed angled inwardly toward the line opening at the upper portions thereof, and both the line opening and the circular openings are formed with thickened beaded portions extending completely around the line and circular extent thereof. Finally, the thickened beaded portion is of increasing vertical height progressively from the circular openings to the longitudinal mid-point of the line opening or longitudinally mid-way of the top portion, so that the maximum vertical thickness of the beaded portion is at this mid-point and decreases progressively to each of the circular openings.

By way of example, an embodiment of the improved change purse construction of the present invention is illustrated in the accompanying drawings forming a part hereof, wherein like numerals indicate similar parts throughout the several views, and in which.

Figure 1:
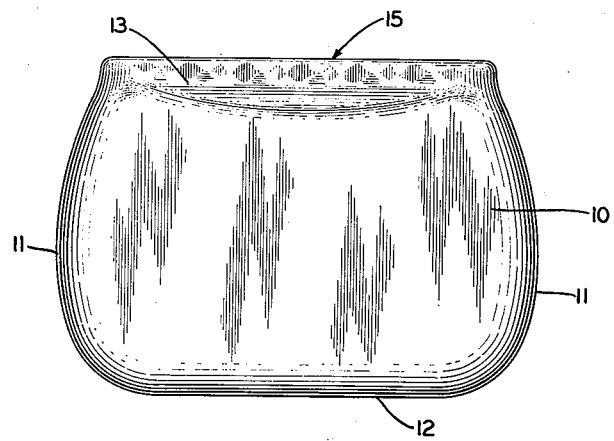
FIG. 1 is a side elevation of the change purse construction of the present invention.
Figure 3:
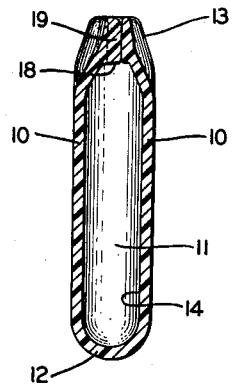
Figure 2:
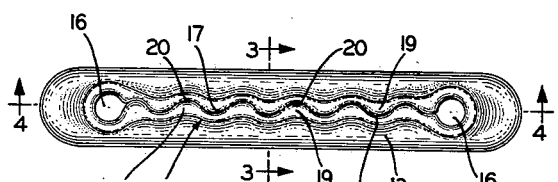
FIG. 2, is a top plan view of the change purse construction of FIG. 1.
Figure 4:
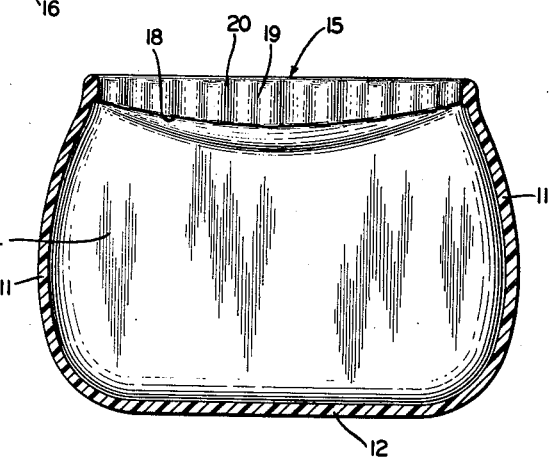
Figure 5:
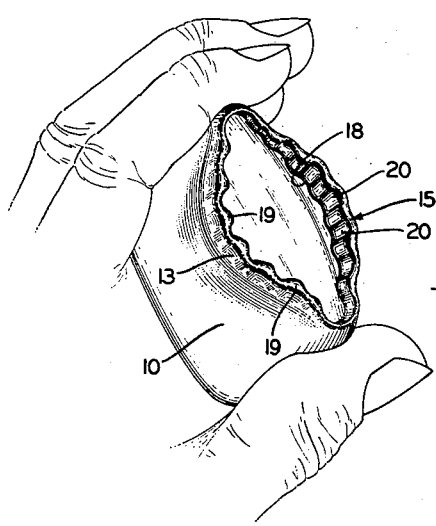

FIG. 3, a lateral vertical sectional view looking in the direction of the arrows 3—3 in FIG. 2;

FIG. 4, a longitudinal vertical sectional view, part in elevation, looking in the direction of the arrows 4—4 in FIG. 2; and FIG. 5, a perspective view illustrating the operation of the closure means of the change purse construction of the present invention and showing this closure means forced into an open position.

As shown in the drawings, the change purse construction of the present invention may be formed with laterally spaced, generally parallel, longitudinally and vertically extending side faces 10 which are integrally joined by the laterally and generally vertically extending end walls 11 and the laterally and generally horizontally extending bottom wall 12. The side faces 10 are preferably generally flat with the end walls 11 being preferably generally arcuately formed both laterally between the side faces 10 and vertically from the bottom wall 12 to the top portion 13 of the change purse construction.

The bottom wall 12 is likewise preferably arcuately formed laterally between the side faces 10.

Thus, the side faces 10, end walls 11 and bottom wall 12 form an upwardly opening pocket 14, and the side faces 10 and end walls 11 are closed at the top portion 13 by a unique form of closure means, generally indicated at 15. The entire purse construction including the closure means 15 is formed of a one-piece molded plastic material, such as rubber or one of the modern plastics, having sufficient resilience for manipulation by hand of the closure means 15 in a manner to be hereinafter described and for providing access to the pocket 14 for inserting coins and the like therein and removing the same therefrom.

The upper extremities of the side faces 10 are formed generally horizontal so that the top portion 13 is horizontal. Furthermore, these upper extremities of the side faces 10 are preferably angled inwardly to the closure means 15 as shown.

Closure means 15 is preferably formed with permanently open circular openings 16 at either end thereof and preferably at the upper extremities of the end walls 11. Between the circular opening 16, the closure means is formed with a generally longitudinal line opening 17 extending the entire distance between the circular openings 16 along this horizontal top portion 13, thereby providing an access to the pocket 14 substantially totally between the end walls 11 and along the inwardly angled upper extremities of the side faces 10.

Furthermore, the closure means 15 is formed with thickened beading 18 completely along both sides of the line opening 17 and around the circular openings 16, with this beading 18 increasing in vertical height or vertical thickness progressively from the circular opening 16 to the longitudinal mid-point of line opening 17, as best seen in FIGS. 4 and 5. This progressively increasing vertical thickness or height of the beading 18 from the circular opening 16 to the longitudinal mid-point of line opening 17 is of the utmost importance in the change purse construction of the present invention for providing the improved closure means 15, as will be hereinafter more fully described.

Still further, the line opening 17 may be provided as an inter-engaging saw-tooth line opening, with this saw-tooth configuration preferably being formed as smooth arcuate projections 19 and depressions 20, all of which are formed within the beading 18. Thus, when the closure means 15 is in its closed position, the projections 19 of line opening 17 are forced resiliently into the depressions 20, completely closing this line opening but with the circular openings 16 preferably remaining open at all times.

For opening the closure means 15 in order to gain access to the pocket 14 for inserting coins and the like therein and removing them therefrom, the thumb is placed near the upper extremity of one of the end walls 11, and one or more fingers are placed at the upper extremity of the opposite end wall 11, as shown in FIG. 5. Thereafter, merely by exerting pressure between the thumb and fingers, forcing the upper portions of end walls 11 toward one another, the closure means 15 is easily opened, again, as shown in FIG. 5. The purpose of the beading 18 being of progressively increased vertical thickness or height from the circular opening 16 or the extremities of the line opening 17 to the mid-point of this line opening, is twofold. The first is that, in the event coins are contained within the change purse construction and this change purse construction is up-ended so that the coins fall to the closure means 15, the increased vertical thickness of the beading 18 will tend to force these circular coins to roll of their own volition toward the end walls 11 or toward the circular openings 16.

This is important in a change purse of this type in which the entire force retaining the closure means 15 closed is merely the resiliency of the plastic material forming the change purse. It is fundamental that the greatest resilient forces tending to retain the line opening 17 closed are at the extremities of this line opening, or in this case at the circular openings 16, with these resilient forces normally decreasing in magnitude toward the longitudinal mid-point of the line opening.

Thus, this increased vertical thickness at the longitudinal mid-point of the line opening tends to force the coins toward portions of the closure means 15 having the greatest resilient closing force, thereby eliminating the danger of the weight of the coins forcing the closure means 15 open.

A further important advantage of the increased vertical thickness of this beading 18 at the longitudinal mid-point of the line opening 17 is that this increased thickness of beading progressively toward this longitudinal mid-point provides progressively greater resilient holding forces toward this longitudinal mid-point. Thus, the resilient holding forces at the longitudinal mid-point of the line opening 17 are greatly increased over those which would be present if this increased thickness were not provided.

Finally, where the interengaging saw-tooth configuration is provided in the beading 18 along the line opening 17, it is much more difficult for coins and the like to force this line opening 17 open, since a flat straight opening is not provided conforming to the flatness of the coin. Thus, this saw-tooth configuration, particularly in combination with the progressively thickened beading, will likewise provide a more secure closure means 15 for the change purse construction.

In the foregoing description, certain terms have been used for brevity, clearness and understanding but no unnecessary limitations are to be implied therefrom, because such words are used for descriptive purposes herein and are intended to be broadly construed.

Moreover, the embodiment of the improved construction illustrated and described herein is by way of example and the scope of the present invention is not limited to the exact details of construction shown.

Having now described the invention, the construction, operation and use of a preferred embodiment thereof, and the advantageous new and useful results obtained thereby, the new and useful construction and reasonable mechanical equivalents thereof obvious to those skilled in the art are set forth in the appended claims.

I claim:

1. Change purse construction including integrally formed spaced generally vertically and longitudinally extending side faces joined by generally vertically and laterally extending end walls and a generally laterally and horizontally extending bottom wall forming an upwardly opening pocket, the side faces and end walls terminating upwardly in a generally horizontally extending top portion, a longitudinally extending line opening formed in the top portion, a thickened beaded portion formed completely around the line opening integral with the remainder of the change purse, the beaded portion increasing in thickness from the longitudinal extremities thereof progressively toward the longitudinal mid-point thereof, and the entire change purse being formed of a resilient plastic material.

2. Change purse construction including integrally formed spaced generally vertically and longitudinally extending side faces joined by generally vertically and laterally extending end walls and a generally laterally and horizontally extending bottom wall forming an upwardly opening pocket, the side faces and end walls terminating upwardly in a generally horizontally extending top portion, a longitudinally extending line opening formed in the top portion, a thickened beaded portion formed completely around the line opening integral with the remainder of the change purse, the beaded portion increasing in vertical thickness from the longitudinal extremities thereof progressively toward the longitudinal mid-point thereof, and the entire change purse being formed of a resilient plastic material.

3. Change purse construction including integrally formed spaced generally vertically and longitudinally extending side faces joined by generally vertically and laterally extending end walls and a generally laterally and horizontally extending bottom wall forming an upwardly opening pocket, the side faces and end walls terminating upwardly in a generally horizontally extending top portion, a longitudinally extending line opening formed in the top portion, a thickened beaded portion formed completely around the line opening integral with the remainder of the change purse, the beaded portion increasing in vertical thickness from the longitudinal extremities thereof progressively toward the longitudinal mid-point thereof, the beaded portion being formed of interengaging saw-tooth configuration forming a saw-tooth line opening having alternate interengaging projections and depressions, and the entire change purse being formed of a resilient plastic material.

References Cited in the file of this patent

UNITED STATES PATENTS

| | | |
|---|---|---|
| 2,667,906 | Stiller | Feb. 2, 1954 |
| 2,868,254 | Saad | Jan. 13, 1959 |
| 2,909,203 | Reaves | Oct. 20, 1959 |
| 3,016,940 | Mullin | Jan. 16, 1962 |